Feb. 9, 1971 L. L. BOURU 3,561,195
GAS PURIFYING DEVICE
Filed Nov. 4, 1969 2 Sheets-Sheet 1
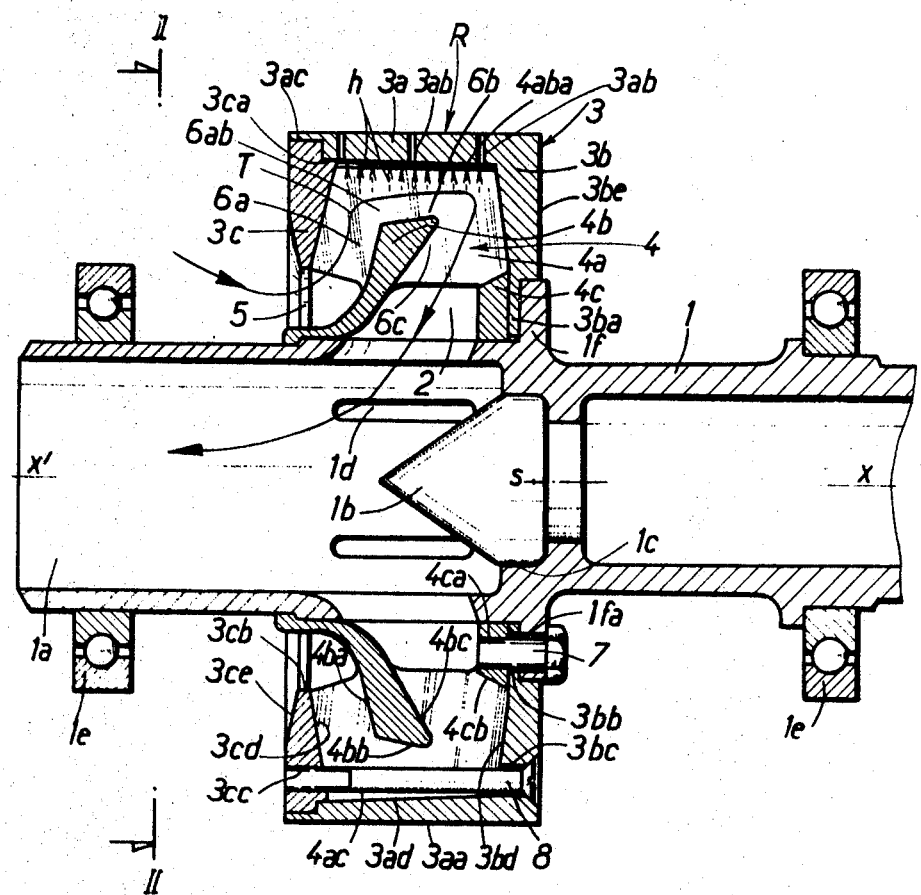
FIG.:1

Feb. 9, 1971 L. L. BOURU 3,561,195
GAS PURIFYING DEVICE
Filed Nov. 4, 1969 2 Sheets-Sheet 2
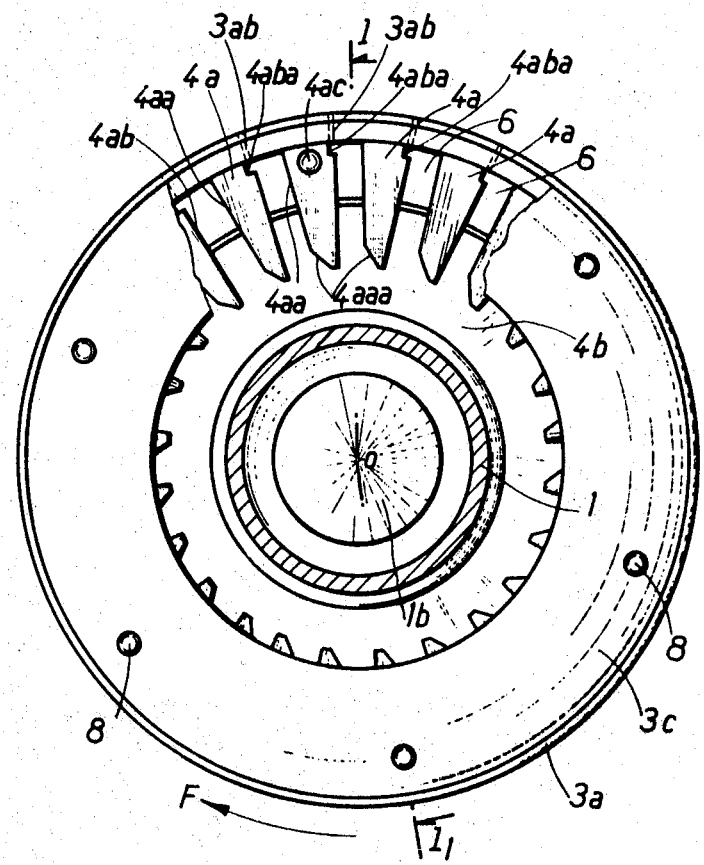
FIG.:2

3,561,195
GAS PURIFYING DEVICE
Louis Léonard Bouru, Corbeil-Essonne, France, assignor to Societe Nationale d'Etude et de Construction de Moteurs d'Aviation, Paris, France, a company of France
Filed Nov. 4, 1969, Ser. No. 873,990
Claims priority, application France, Nov. 6, 1968,
172,808
Int. Cl. B01d 45/14
U.S. Cl. 55—409                                    14 Claims

ABSTRACT OF THE DISCLOSURE

A device for purifying gas by separation therefrom of liquid or solid particles contained in the gas, comprising a hollow rotatable casing rotatable about its axis with means for the entry of impure gas at one end wall, passages for the exit of particles at its periphery and means for the exit of purified gas adjacent its axis, vanes, subdividing the casing into longitudinal ducts and baffle means in each duct causing the gas in each duct to flow through a centrifugal entry section, an axial convergent intermediate section and a centripetal divergent exit section, thereby to promote efficient purification with minimum pressure drop through the device.

---

This invention relates to gas purification and in particular air purification, by the technique of separating out solid or liquid particles contained in such gas, and more specifically relates to a purification device comprising a hollow casing which rotates about an axis, said casing being delimited by a lateral wall which is a solid of revolution about said axis, and through which there are formed passages for the evacuation of the particles, as well as by two end covers one of which, in the neighborhood of the axis of the casing, contains an entry orifice for the gas to be purified, said casing furthermore having in the neighborhood of its axis passages for evacuating the purified gas and being equipped with a plurality of vanes which divide its internal volume into a plurality of individual ducts each delimited by the mutually opposite faces of two consecutive vanes.

The problem of purifying gas arises, for example, in the operation of machines such as compressors, which involve use of one or more fluids in differing pressure stages and which are the location of leakage flows from the high pressure parts of the system towards the lower pressure parts of the system at joints formed between the moving components. These leakage flows, when they pass through the bearings of the machine, are inclined to pick up part of the oil injected into said bearings for the proper operation of the latter. The result is an oil loss which is far from being negligible and which, for reasons of economy, should be limited by recovering as far as possible the thus entrained oil and returning it to a reservoir.

It is for this reason that purifier devices or oil-recovery devices, in particular of the kind hereinbefore described, are currently fitted in gas turbine jet engines, in particular. The rotor, supplied with the gas which is to be purified (in the present case air with entrained oil), is driven either from the system used to drive the accessory equipment, or directly by the main shaft of the engine. The rotor subjects the gas to be purified to the action of centrifugal force. Being heavier, the liquid particles are evacuated through the passages formed in the rotor periphery whilst the purified gas escapes through the discharge passages located in the neighborhood of the rotor axis.

Experience has shown, however, that devices of this kind do not always operate completely satisfactorily from the point of view of efficiency of separation; it has been found, in particular, that their use leads to increased oil and air pressure losses.

The object of the invention is to provide a purifier device of the kind generally described hereinbefore but exhibiting an improved efficiency in relation to the known devices.

In accordance with the invention, in a device of the kind described each of the vanes extends over the whole axial length of the casing defined between the two end covers and exhibits, viewed in section in a plane taken perpendicular to the axis of the casing, approximately the shape of a wedge, so that the mutually opposite faces of two consecutive vanes are substantially parallel and a baffle projecting into each of the individual ducts between the vanes cooperates with the internal faces of the lateral walls and of the end covers of the casing so that said duct is sub-divided into a centrifugal entry section communicating with the intake orifice for the gas to be purified and of substantially constant section, an intermediate convergent section substantially parallel to the axis of the casing, and a divergent centripetal exit section communicating with the passages through which the purified gas is discharged.

The combination of these features contributes, as will be explained hereinafter, to achieving in the gas flows passing through the purifying device, a flow pattern which is favourable from the aerodynamic end separating points of view, the latter function being by centrifugal and inertial effects, with the result that the device in accordance with the invention provides increased efficiency whilst at the same time pressure losses are reduced.

In accordance with one embodiment of the invention, the baffle has a first face turned towards the internal face of the entry end of the casing and substantially parallel to said internal face, in order to form said section of constant cross-sectional area, a second face turned towards the internal face of the lateral wall of the casing and inclined in relation thereto in order to form therewith said convergent and substantially axial section, and a third face turned towards the internal face of the other end cover of the casing and again inclined in relation to said face in order to form in relation thereto said divergent section.

In accordance with another embodiment of the invention, each of the individual ducts has an axial plane of symmetry and the parallel faces of two consecutive vanes are parallel to this plane of symmetry.

In accordance with another embodiment of the invention, the casing is fixed to a hollow drive shaft. The passages through which the purified gas is discharged can then communicate with the interior of this shaft. Preferably, the hollow shaft will be provided internally with a deflector located in the neighbourhood of said discharge passages and this will facilitate the penetration of the centripetal purified gas flow into the interior of the shaft.

In accordance with another embodiment of the invention, the internal face of the lateral wall of the casing is slightly inclined in relation to the axis of the rotor, diverging from the annual entry orifice. As far as the internal faces of the two end covers are concerned, they will preferably be steeply inclined in relation to the rotor axis and slightly inclined towards one another and away from said axis. These features, as will be explained hereinafter, facilitate the collection of the liquid or solid particles which are separated out, and the conveying thereof towards the appropriate discharge passages.

These discharge passages are advantageously distributed along several generatrices of the casing.

In accordance with one embodiment of the invention, each of the vanes is slotted in the neighbourhood of the external edge of its front face, considered in relation to the direction of rotation of the rotor, in order to present a longitudinal groove, each of the aforementioned generatrices being located substantially opposite one of said longitudinal grooves. In this manner the collection and discharge of the separated particles is facilitated.

In accordance with another embodiment of the invention, each of the vanes is chamfered in the neighbourhood of the internal edge of its rear face, considered in the direction of rotation of the rotor, in order to facilitate the entry of the gas flow into each of the longitudinal ducts.

In accordance with another embodiment of the invention, the arrangement of vanes is advantageously carried by the baffle and, possibly additionally, by a ring located in the neighbourhood of that one of the end covers of the casing which is opposite the annular entry orifice.

In accordance with an embodiment of the invention which is applicable to the latter case, this supporting ring has an inclined face cooperating with the third face of the baffle in order to determine therewith a centripetal section of convergent form, which follows the divergent centripetal section referred to hereinbefore, and in which the purified fluid is slightly accelerated before being discharged.

The ensuing description referring to the accompanying drawing will indicate by way of non-limitative example how the invention may be carried into practice.

In the drawings:

FIG. 1 is an axial section on the line I–O–$I_1$ of FIG. 2, through a purifier or separator device in accordance with the invention;

FIG. 2 is a transverse section, partially cut away, on the line II—II of FIG. 1, through said device.

In the figures, the reference 1 has been used to designate a hollow shaft of axis X'–X which drives a rotor R of a separator which is assumed, for example, to be an oil separator, that is to say a device for separating oil particles carried in suspension in an air flow. The direction of rotation of the rotor has been marked by the arrow F in FIG. 2.

The interior of the shaft 1 forms a passage 1a closed off in one direction by a deflector cone 1b force-fitted in a seating 1c. Longitudinal slots 1d formed at the periphery of the shaft place the passage 1a in communication with an annular space 2 defined around said shaft by the rotor R.

The shaft 1 is carried in bearings 1e and can be rotated at high speed by means of known arrangements which have not been shown. In order to facilitate the attachment of the rotor R, the shaft has a shoulder or flange 1f containing uniformly spaced holes 1fa on a pitch circle about the axis X'–X.

The rotor R comprises a hollow casing 3 and a system of vanes or blades 4. The casing 3 comprises a lateral wall 3a closed by two end covers 3b and 3c. The lateral wall 3a externally has the form of a cylinder of revolution 3aa and contains small openings or passages 3ab distributed along several generatrices. The end cover 3b contains a central bore around which there is an internal flange 3ba. This end cover likewise contains fixing holes 3bb, 3bc uniformly distributed on two coaxial pitch circles, the smaller of which, on the flange 3ba, corresponds to the pitch circle of the holes 1fa formed in the flange 1f of shaft 1 and contains the same number of holes.

The end cover 3c is constituted by a detachable cover containing a positioning groove 3ca for easy attachment to the lateral wall 3a of the casing, the latter, to this end, carrying a guide spigot 3ac. This cover contains a central bore 3cb the diameter of which is substantially larger than that of the shaft 1, and a plurality of threaded holes 3cc respectively positioned in extension of the holes 3bc. The bore 3cb cooperates with the external surface of the shaft 1 to define an annular entry orifice 5 for the gas to be purified.

The internal face 3cd and external face 3cc of the end cover 3c are inclined in relation to the axis X'–X of the oil separator. Similarly, the internal faces 3ad and 3bd of the lateral wall 3a and the end cover 3b of the casing, respectively, are inclined in relation to said axis. These faces 3cd and 3bd are slightly inclined towards one another and away from the axis X'–X and have the general form of cones of revolution of very wide apex angle; thus, the apex S of the cone defining the surface 3bd is advantageously located in the neighbourhood of the intersection between the axis X'–X and the plane of the external face 3be of the end cover 3b. As far as the cone defining the internal face 3ad of the lateral wall 3a of the casing is concerned, it by contrast has a small apex angle and its apex is located some distance away on the half-axis SX.

The blading 4 comprise a plurality of longitudinal vanes 4a distributed peripherally inside the casing 3 and dividing the internal volume of the latter into a plurality of longitudinal individual ducts 6 delimited laterally, in each instance, by the mutually opposite faces 4aa, 4ab of two consecutive vanes. As FIG. 2 shows, the vanes 4a each exhibit, seen in section in a plane perpendicular to the axis X'–X of the oil separator, a generally triangular or wedge-shaped form, so that the mutually opposite faces referred to are substantially parallel in pairs. In the case illustrated, where each of the ducts 6 defined by two consecutive vanes has an axial plane of symmetry such as that marked OI, said mutually opposite faces are likewise parallel to said plane of symmetry.

The front faces 4ab (considered in relation to the direction of rotation of the rotor, as indicated by the arrow F) of the vanes 4a, are slotted at their external edges in order each to present a longitudinal groove 4aba. As far as the rear faces 4aa of these vanes are concerned, they can advantageously be chamfered at their internal edges, where marked by the reference 4aaa.

Certain of the vanes 4a contain holes 4ac of the same size as the holes 3bc and 3cc of the end cover 3b and the end cover 3c of the casing 3, and in alignment with said holes.

The vanes 4a are carried by a sleeve 4b and by a ring 4c in order that their external edges are applied in each case precisely against the internal faces 3cd, 3ad and 3bd of the casing. The sleeve 4b and the ring 4c each contains a central bore of the same diameter as the shaft 1. The ring 4c is, furthermore, drilled out to form threaded holes corresponding in number and drilling diameter to the holes 1fa and 3bb formed in the flange 1f of the shaft 1 and the end cover 3b of the casing 3, and moreover aligned with said holes. The reference 4cb indicates an inclined face on said ring. The sleeve 4b, the successive faces of which have been marked by the references 4ba, 4bb, 4bc, constitutes in respect of each of the longitudinal ducts 6, a baffle which projects into said duct and cooperates with the internal faces 3cd, 3ad and 3bd of the casing in order to sub-divide said duct into a centrifugal entry section 6a communicating with the annular entry orifice 5 for the gas to be purified, an intermediate section 6b substantially parallel to the axis of the rotor, and a centripetal exit section 6c communicating, through the annular space 2, with the longitudinal orifices or passages 1d. Reference T has been used to mark the mean trajectory, of generally U-shaped pattern, followed by the gas in a longitudinal duct 6. An examination of FIG. 1 shows that the transverse section of the duct 6, considered in planes perpendicular to the mean trajectory T, are moreover substantially constant in the upstream portion 6a, then decrease through the intermediate portion 6b, and then successively increase and decrease in the downstream portion 6c. The reference 6ab has been used to designate a transitional zone between the sections 6a and 6b.

is applied, through the intermediary of the ring 4c, the

The assembly of the separator in accordance with the invention is extremely simple. The shaft 1 receives on its flange or collar 1f the casing 3 against which latter there vane system 4. The holes 1fa, 3bb and 4ca formed respectively in the flange 1f, in the end cover 3b and in the ring 4c are aligned with one another in order to enable these components to be fixed together by means of screws 7. The end cover 3c is then placed in position so that the holes 3cc which it contains are aligned with the holes 4ac formed in certain blades of the blades 4a and with the holes 3bc formed in the end cover 3b in order to enable the vanes to be fixed to the casing by means of long screws 8. The generatrices of the casing 3 along which the passages 3ab are drilled will then be in alignment with the grooves 4aba formed in the external edges of the vanes 4a. The shaft 1 is then assembled in its bearings and coupled to a drive system which has not been shown.

The operation of the device is as follows:

Once the rotor is rotating in the direction of arrow F, the purified gas enters the casing 3 through the annular space 5 and follows a turning trajectory through the casing substantially in an axial plane. This trajectory is successively centrifugal, axial and centripetal in each of the multiple ducts 6 in which it is subjected to the action of the centrifugal force. Being heavier, the solid or liquid particles (in the present case oil droplets, escape (arrows h) through the discharge passages 3ab.

As far as the gas or air, which is small lighter, is concerned, this is discharged in purified form through the slots 1d and enters the passage 1a formed inside the shaft 1.

An analysis will now be given of the conditions in which the gas passes through the separator.

The gas for purification enters the separator through an annular orifice of small means diameter, that is to say in a zone in which the peripheral speeds of the walls delimiting the gas flow at entry, is relatively low. The result is a reduction in aerodynamic disturbances (and in particular shock-waves), to which this gas flow is subject, and this facilitates uniform distribution of the flow amongst the various elementary ducts 6 and makes it possible to reduce the pressure loss which it experiences. The inclination of the external face 3ce of the end cover 3c contributes, in its turn, to easy entrance of the gas into the separator.

The gas is subsequently split up by the vanes 4a into a large number of layers of small volumetric size each subjected to the action of the centrifugal force independently of the others. The result is that practically all the solid or liquid particles (in the present instance oil droplets), even those not in direct contact with the walls, are set into rotation at the speed of the rotor.

In the upstream section 6a of each of the ducts 6, the mutually opposite faces 3cd and 4ba of the end cover and the baffle are substantially parallel to one another so that the gas to be purified reaches the operating speed without any reduction in the flow cross-section offered to the flow T, and this contributes to a reduction in the pressure losses whilst ensuring incipient oil separation along the internally inclined face 3cd of the cover 3c. The separated oil rises to the periphery and escapes through the discharge passages 3ab.

At the exit of the upstream section 6a, the gas flow is deflected at the same time that it is expanded in the transitional zone 6ab preceding the intermedite section 6b. This expansion is followed, in the intermediate zone 6b, by a substantial compression in a convergent section formed between the mutually opposite and mutually inclined faces 3ad, 4bb of the wall 3a of the casing and of the sleeve 4b. The result is that the gas flow is accelerated and this improves oil separation by inertial effect. This oil is projected under the action of the centrifugal force against the face 3ad of the wall 3a. The slight inclination in the opposite direction, of this face tends to maintain the oil on said wall (and indeed even to make it move back in the upstream direction under the effect of the centrifugal force), whence it is discharged through discharge passages 3ab.

The already substantially purified gas flow is then decelerated in the downstream section 6c which takes the form of a divergent passage between the mutually opposite faces 4bc, 3bd which are inclined away from one another, i.e. the faces of the sleeve 4b and of the end cover 3b of the casing. The separating effect is thus increased because the gas is slowed whilst the residual oil droplets, whose inertia is much higher, tend to carry on.

Finally, at the output of the downstream section 6c, the purified gas is accelerated in a short-length convergent section delimited by the mutually opposite faces 4bc, 4cb of the sleeve 4b and the ring 4c, and then enters the annular space 2 from which it is discharged through discharge passages 1d into the passage 1a formed inside the shaft 1. The inclination of the external face 4cb of the ring 4c promotes the collection on this face of the final droplets of oil which have been separated out, and their subsequent impelling along the face 3bd of the end cover of the casing in the direction of the face 3ad through which the discharge passages 3ab are drilled.

If the transverse component (FIG. 2) of the gas flow through the separator is inspected, then it will be seen immediately that because of the parallelism of the faces 4aa, 4ab each delimiting the ducts 6, there is obtained in these ducts, a substantially constant radial separating effect, the chamfers 4aaa simply being designed to form a short convergent entry zone which will promote the shockless entry into the ducts 6 of the portions of the gas flow being purified.

The oil droplets initially collect under the effect of inertia on the forward faces 4ab of the vanes 4a and then move away from the axis by reason of the centrifugal force to which they are subjected, collecting subsequently in the groove 4aba and escaping finally through the discharge passages 3ab located opposite said grooves and sized to accord with the quantity of oil which has to be discharged.

The combination of features described hereinbefore confers upon the separator in accordance with the invention an improved efficiency compared with conventional separators. These advantages are ascribable in particular to the major degree of splitting up of the mixture because of the presence of the vanes, to the reduction in the pressure losses (this reduction being chiefly due to the fact that the deflections undergone by the gas flow are small in number and magnitude and are always located in a substantially axial plane), to a carefully designed form of the cross-sectional flow areas offered to the gas flow, which enables the inertial differences between the gas and liquid (or solid) particles to be exploited and finally to the gas to be purified being subjected to centrifugal action as soon as it enters the separator.

It will be appreciated that the embodiments described are examples and are open to modification in various ways within the scope of the invention as defined by the appended claims. Thus, the separator, described in detail here in relation to the removal of oil from air, could equally well be used for the separation of water droplets or of dust or the like.

What is claimed is:

1. A separating device for purifying gas of particle impurities comprising in combination:

a casing having a lateral wall which is a surface of revolution about the axis of the casing, two end covers, means for entry of impure gas at one end cover, passages for the exit of particles through its lateral wall and means adjacent its axis for the exit of purified gas;

means for rotating the casing about its axis;

vanes extending within the casing between its end covers to subdivided the casing into a plurality of longitudinal ducts, each of said vanes being generally wedge-shaped in section perpendicular to the axis of the casing with a wedge angle such that mutually opposite faces of consecutive vanes extend in substantially parallel relationship; and baffle means projecting into each said duct and, in association with the lateral wall and end covers of the casing, subdividing the duct longitudinally into a centrifugal entry section of approximately uniform flow area communicating with the gas entry means, an axial convergent intermediate section and a centriplet divergent exit section communicating with the gas exit means.

2. A device according to claim 1, wherein the baffle means has a first face turned towards the internal face of the entry end cover of the casing and substantially parallel to said face, in order to form said constant flow-area section, a second face turned towards the internal face of the lateral wall of the casing and inclined in relation thereto in order to form therewith said substantially axial convergent section, and a third face turned towards the internal face of the other end cover of the casing and inclined away therefrom in order to define said divergent centripetal section.

3. A device according to claim 1, wherein each of the individual ducts has an axial plane of symmetry; and in that the parallel faces of two consecutive vanes are parallel to said plane of symmetry.

4. A device according to claim 1, including a hollow drive shaft and means fixing the casing to said shaft.

5. A device according to claim 4, wherein the gas exit means communicate with the interior of the hollow shaft.

6. A device according to claim 5, including a deflector fitted within the hollow shaft adjacent said discharged orifices.

7. A device according to claim 1, wherein the internal face of the lateral wall of the casing is slightly inclined in relation to the axis of the casing and away from the entry orifice through which enters the gas to be purified.

8. A device according to claim 1, wherein the internal faces of the two end covers are steeply inclined in relation to the axis of the casing and slightly inclined towards one another and away from said axis.

9. A device according to claim 1, wherein each of the vanes is slotted in the neighbourhood of the external edge of its front face, considered in relation to the direction of rotation of the casing, in order to form a longitudinal groove.

10. A device as claimed in claim 9, wherein the passages through which the particles are discharged, are distributed along several generatrices of the casing, each of said generatrices being located substantially opposite a longitudinal groove.

11. A device according to claim 1, wherein each of the vanes is chamfered in the neighbourhood of the internal edge of its rear face, considered in relation to the direction of rotation of the casing.

12. A device according to claim 1, including means mounting the vanes on the baffle.

13. A device according to claim 12, including a ring located adjacent the casing end cover remote from the gas entry means and means additionally supporting the vanes on said ring.

14. A device as claimed in claim 13, wherein said ring has an inclined face cooperating with the third face of the baffle in order to determine therewith a centripetal convergent section following said divergent centripetal section.

References Cited
UNITED STATES PATENTS

| | | | |
|---|---|---|---|
| 710,626 | 10/1902 | Smith | 55—404 |
| 1,339,211 | 5/1920 | McKerahan | 55—408 |
| 3,415,383 | 12/1968 | Earle, Jr. et al. | 55—408 |

FRANK W. LUTTER, Primary Examiner

B. N. NOZICK, Assistant Examiner

U.S. Cl. X.R.

233—30; 416—181